US008710366B2

(12) United States Patent
Rosen et al.

(10) Patent No.: US 8,710,366 B2
(45) Date of Patent: Apr. 29, 2014

(54) TERMINAL BOX ASSEMBLY

(75) Inventors: Seth E. Rosen, Middletown, CT (US); Lino S. Italia, Rocky Hill, CT (US); John M. Beck, Windsor, CT (US); Darryl A. Colson, West Suffield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 107 days.

(21) Appl. No.: 13/398,113

(22) Filed: Feb. 16, 2012

(65) Prior Publication Data

US 2013/0213706 A1 Aug. 22, 2013

(51) Int. Cl.
*H02G 3/14* (2006.01)

(52) U.S. Cl.
USPC .............................. 174/50; 248/906; 439/535

(58) Field of Classification Search
USPC ............ 174/50; 220/4.02; 248/906; 361/657, 361/823; 439/709, 716
See application file for complete search history.

(56) References Cited

U.S. PATENT DOCUMENTS

| | | | | | |
|---|---|---|---|---|---|
| 3,775,733 | A | * | 11/1973 | Ege | 439/724 |
| 4,273,408 | A | * | 6/1981 | Orr | 439/737 |
| 4,700,384 | A | * | 10/1987 | Meyer | 379/438 |
| 4,729,059 | A | * | 3/1988 | Wang | 361/657 |
| 4,850,014 | A | * | 7/1989 | Gillis et al. | 379/413.02 |
| 5,933,563 | A | * | 8/1999 | Schaffer et al. | 385/135 |
| 6,653,561 | B2 | * | 11/2003 | Lalancette et al. | 174/50 |
| 7,527,523 | B2 | * | 5/2009 | Yohn et al. | 439/564 |
| 8,314,332 | B1 | * | 11/2012 | Shotey et al. | 174/50 |
| 8,378,232 | B2 | * | 2/2013 | Drane | 174/482 |
| 2013/0048366 | A1 | * | 2/2013 | O'Neil | 174/350 |

* cited by examiner

*Primary Examiner* — Dhirubhai R Patel
(74) *Attorney, Agent, or Firm* — Cantor Colburn LLP

(57) ABSTRACT

A terminal assembly has a terminal box including a divider extending in a front-to-rear direction of the terminal box and dividing the terminal box into a first chamber and a second chamber, the first chamber being larger than the second chamber and a terminal block mounted in the first chamber configured to have a plurality of contacts mounted onto the terminal block.

17 Claims, 7 Drawing Sheets

TERMINAL BOX ASSEMBLY

BACKGROUND OF THE INVENTION

Exemplary embodiments pertain to the art of providing power to a fan, and in particular to a terminal box assembly mounted to a fan.

A fan assembly, such as a ram air fan assembly, may include electrically controlled motors and sensors. Wires from the motors and sensors may be mounted to, or may pass through, a terminal box.

BRIEF DESCRIPTION OF THE INVENTION

Disclosed is a terminal assembly comprising a terminal box including a divider extending in a front-to-rear direction of the terminal box and dividing the terminal box into a first chamber and a second chamber, the first chamber being larger than the second chamber and a terminal block mounted in the first chamber configured to have a plurality of contacts mounted onto the terminal block.

Also disclosed is a terminal block comprising a plurality of terminal block mounting holes at ends of the terminal block in a side-to-side direction for mounting the terminal block to a terminal box and a plurality of contact mounting holes arranged between the terminal block mounting holes in the side-to-side direction, the contact mounting holes arranged to be non-co-linear with the terminal block mounting holes in the side-to-side direction.

Also disclosed is a terminal box comprising a front panel, a rear panel, and two side panels connecting the front and rear panels to define an inside of the terminal box and a divider extending in a front-to-rear direction of the terminal box and dividing the terminal box into a first chamber and a second chamber, the first chamber being larger than the second chamber.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
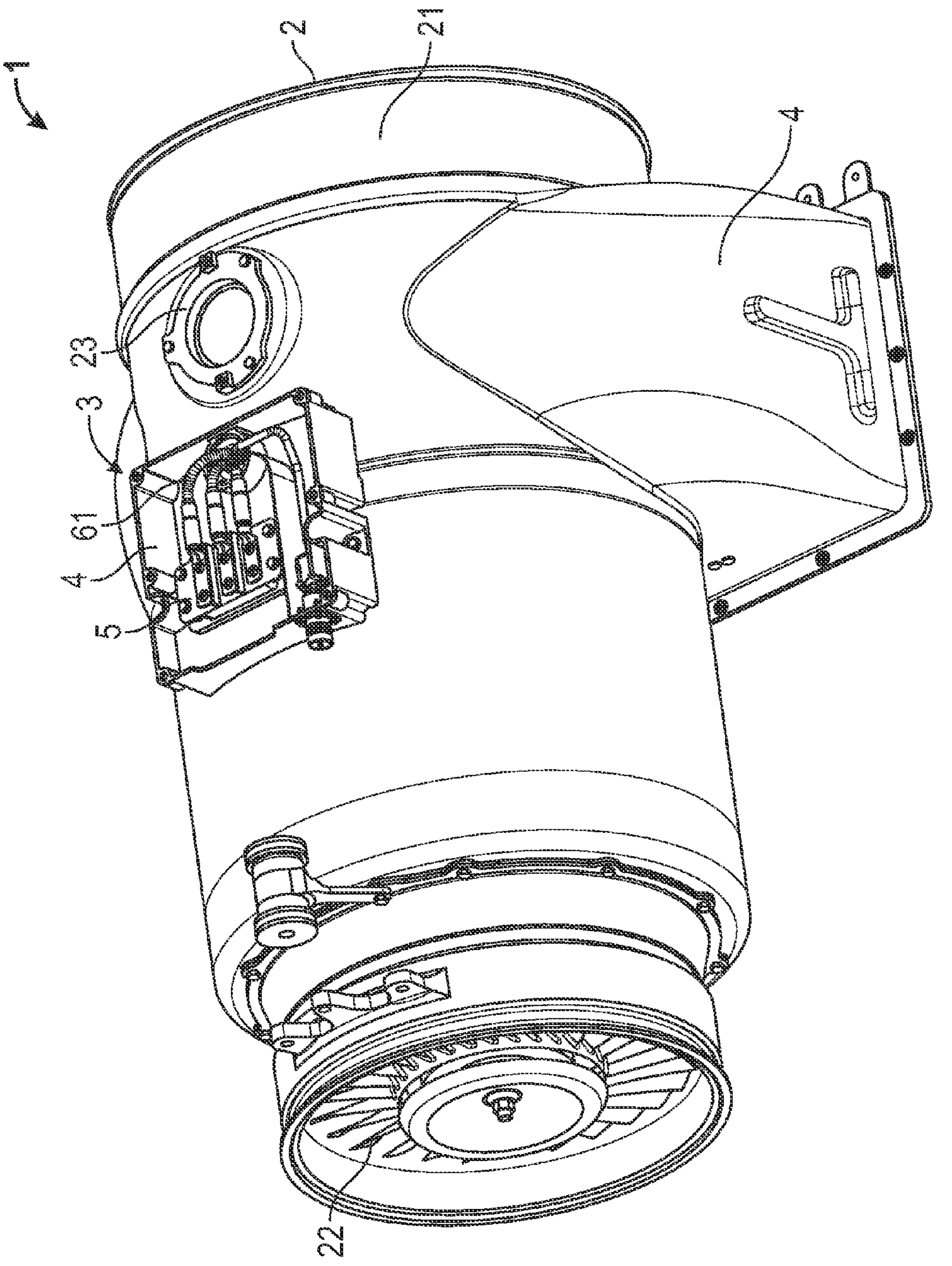
FIG. 1 illustrates a ram air fan assembly according to an embodiment of the present invention.

FIG. 1 illustrates a ram air fan assembly 1 according to an embodiment of the present invention. The ram air fan assembly 1 includes a fan 2 and a terminal box assembly 3 including a terminal box 4 and a terminal block 5. The fan 2 includes a housing 21 and an intake 22 at one end of the housing 21.

Motor power wires 61 extend from the terminal block 5 through the fan 2 to a motor on the bottom side of the fan 2.

Figure 2:
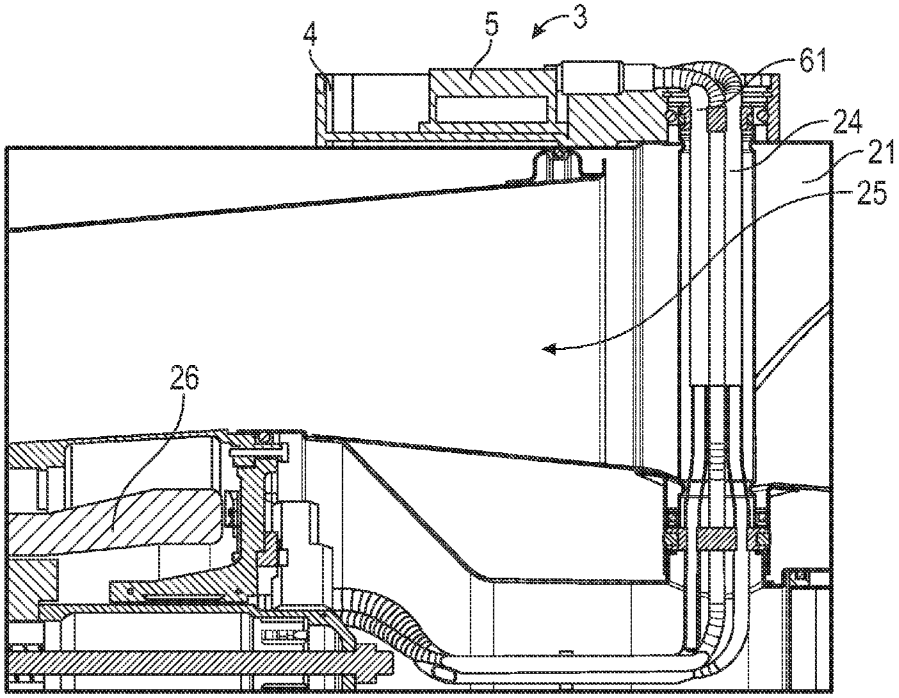
FIG. 2 is a cross-section view of the ram air fan assembly.

FIG. 2 is a cross-section view of the ram air fan assembly 1 shown in FIG. 1 taken along its longitudinal axis. The housing 21 may have a cylindrical or conical shape and may define a cavity 25 through which the air or gas passes through the fan 2. The terminal box assembly 3 may be located on one side of the fan housing 21, and a motor stator 26 may be located on an opposite side of the fan housing 21. A tube 24 may extend from the terminal box 4 to the motor stator 26, and wires 61 may extend from the terminal block 5 through the tube 24 to the terminal block 5.

Figure 3:
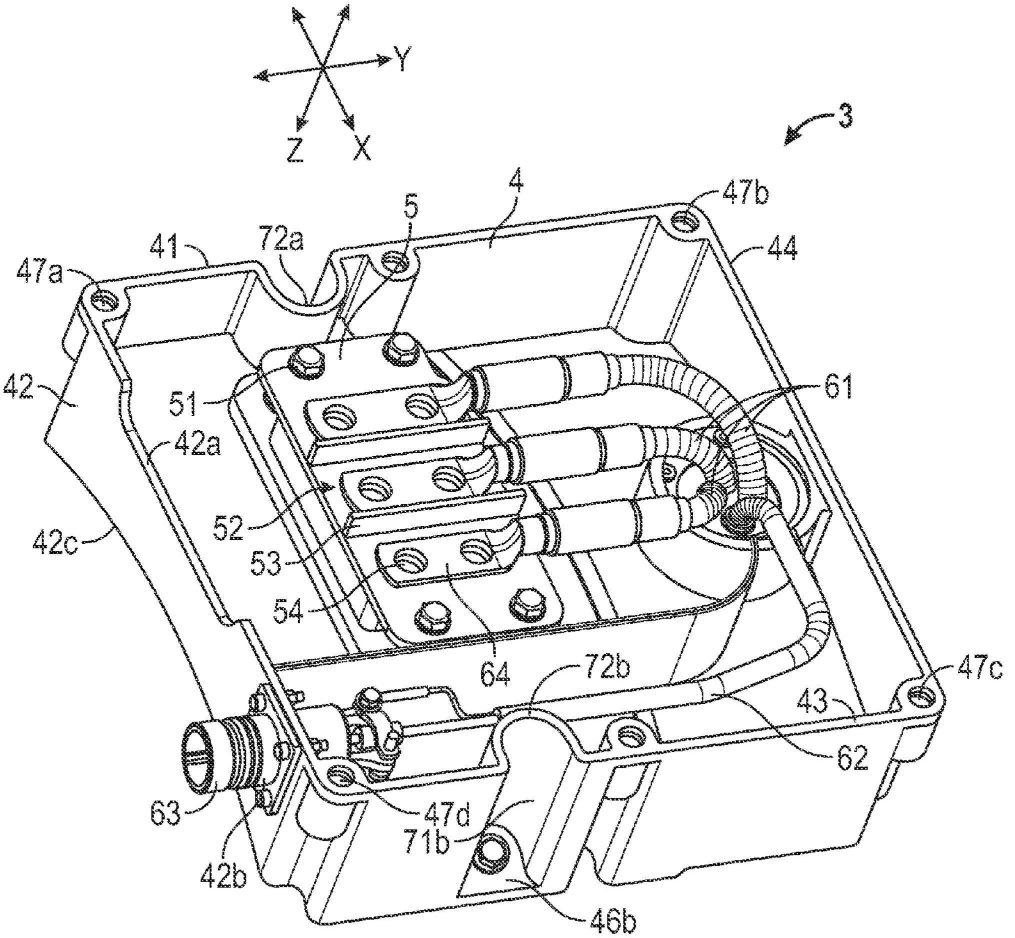
FIG. 3 is a perspective view of a terminal box assembly according to an embodiment of the invention.
Figure 4:
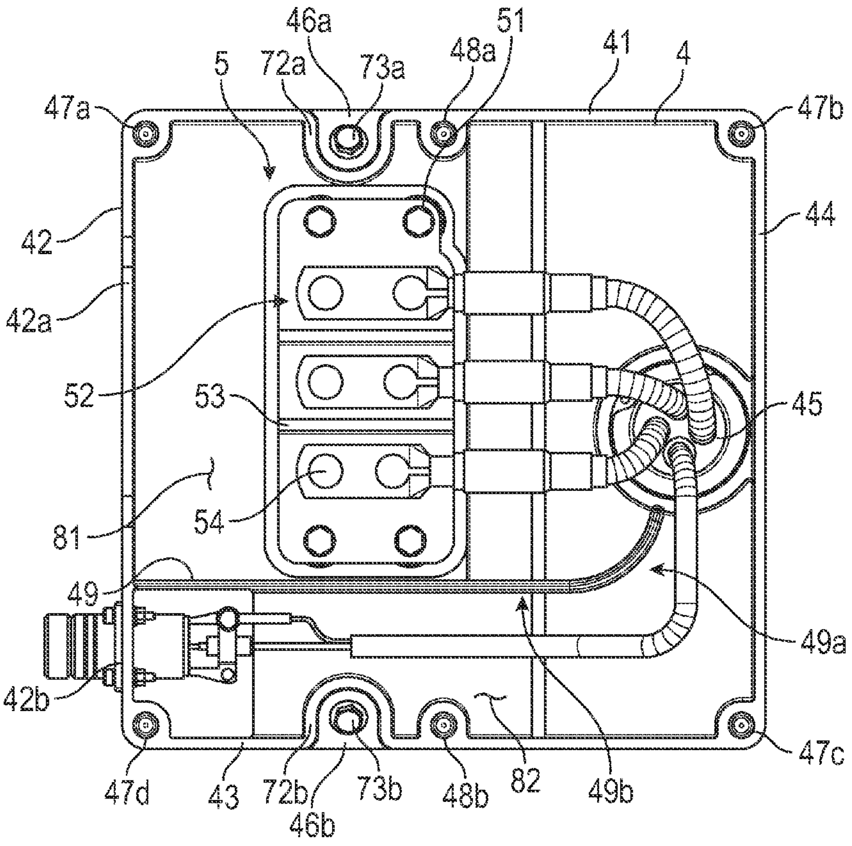
FIG. 4 is a top side view of the terminal box assembly according to an embodiment of the invention.

FIGS. 3 and 4 illustrate the terminal box assembly 3 according to one embodiment of the present invention. The terminal box assembly 3 includes a terminal box 4 and a terminal block 5. The terminal box 4 includes a first side panel 41, a front panel 42, a second side panel 43, and a rear panel 44. The first and second side panels 41 and 43 may be defined as panels intersecting an axis X and the front and rear panels 42 and 44 may be defined as panels intersecting an axis Y that is perpendicular to the axis X.

In the present specification and claims, a front-to-rear axis is defined as the axis Y, intersecting the front and rear panels 42 and 44. A side-to-side axis is defined as the axis X, intersecting the side panels 41 and 43, the axis X being perpendicular to the axis Y. A height axis Z is defined as an axis perpendicular to the X and Y axes. These definitions are provided for purposes of clarity in describing embodiments of the present invention, only, and embodiments of the present invention encompass devices in which these axes are undefined or are defined in an alternative manner.

The first and second side panels 41 and 43 may include mounting recesses 71*a* and 71*b* formed by concave portions 72*a* and 72*b* of the side panels 41 and 43, and mounting surfaces 46*a* and 46*b*. Holes 73*a* and 73*b* may be formed in the mounting surfaces 46*a* and 46*b* to mount the terminal box 4 to the housing 21 of the fan 2.

Holes 47*a*, 47*b*, 47*c*, and 47*d* may be located at corners of the terminal box 4 to mount a cover to the terminal box 4. In addition, holes 48*a* and 48*b* may be formed along the inner surfaces of the first and second side panels 41 and 43 to mount the cover to the terminal box 4.

The terminal box 4 may also include a rim 45 defining an opening to the tube 24 extending through the fan 2. The rim 45 may abut the rear panel 44 and may have a circular shape. A divider panel 49 extends primarily along the Y axis in a front-to-rear direction of the terminal box 4. The divider 49 includes a curved portion 49*a* connected to the rim 45 and curving from the rim 45 toward the second side panel 43. A straight portion 49*b* extends from the curved portion 49*a* to contact the front panel 42. The rim 45 may have a height less than a height of the rear panel 44, and the divider 49 may have a height that is the same as the rear panel 44.

The straight portion 49*b* of the divider 49 may divide the terminal box 4 in a side-to-side direction along the axis X in a ratio between 1:3.0 to 1:3.6. In one embodiment, the divider 49 divides the terminal box 4 in a side-to-side direction along the axis X in a ratio of approximately 1:3.3. For example, a length of the terminal box 4 on one side of the divider 49 in the side-to-side direction along the axis X may be approximately 5.54 length units (l.u.), and a length of the terminal box 4 on the other side of the divider 49 in the side-to-side direction along the axis X may be approximately 1.68 l.u. In the present specification and claims, the cavity of the terminal box 4 corresponding to the larger ratio element (“3”) is defined as a large cavity 81, and the cavity of the terminal box 4 corresponding to the smaller ratio element (“1”) is defined as a small cavity 82. In the present specification and claims, the term "approximately" accounts for normal variations and tolerances in manufacturing, for example, and may include a range within +/−5% of a described value.

In the present specification and claims, a length unit (l.u.) is defined as any predetermined length, such as one inch, one centimeter, a fraction of an inch or centimeter, or a multiple of an inch or centimeter. In other words, the terminal box 4 may be measured according to any particular length unit, and whichever length unit is utilized is the same throughout the specification and claims. For example, if the centimeter is selected as a length unit, then a length of the terminal box 4 on the large cavity 81 side of the divider 49 in the side-to-side direction along the axis X may be approximately 5.54 cm, and a length of the terminal box 4 on the small cavity 82 side of the divider 49 in the side-to-side direction along the axis X may be approximately 1.68 cm. Alternatively, if inches are selected as a length unit, then a length of the terminal box 4 on the large cavity 81 side of the divider 49 in the side-to-side direction along the axis X may be 3.3 in, and a length of the terminal box 4 on the small cavity 82 side of the divider 49 in the side-to-side direction along the axis X may be 1 in. According to the above definition, the term "length unit" does not limit embodiments of the present invention to any one size, but rather defines ratios and proportions of elements in the embodiments.

The terminal block 5 is located on the large cavity 81 side of the straight portion 49*b* of the divider 49. The terminal block 5 includes an upper surface 52, dividers 53 dividing the upper surface 52 into multiple sections, mounting holes 51 at ends of the terminal block 5, and contact mounting holes 54 located inward from the mounting holes 51.

Contacts 64 are mounted to the upper surface 52 of the terminal block 5 via screws, bolts, pins, or any other fixing mechanism. For example, a bolt may pass through a hole in a contact 64 into the contact mounting hole 54 of the terminal block 5. Motor power wires 61 extend from the contacts 64 into the hole defined by the rim 45 of the terminal box 4. A cable 62, such as a speed sensor cable, may also extend from the hole defined by the rim 45 into the terminal box 4 on the small cavity 82 side of the divider 49. A connector 63, such as a sensor connector, may be mounted in a hole 42*b* on the front panel 42, and may be connected to the cable 62. In one embodiment, the diameter of the rim 45 is between 1.5 and 1.8 l.u., such as 1.65 l.u.

Figure 5:
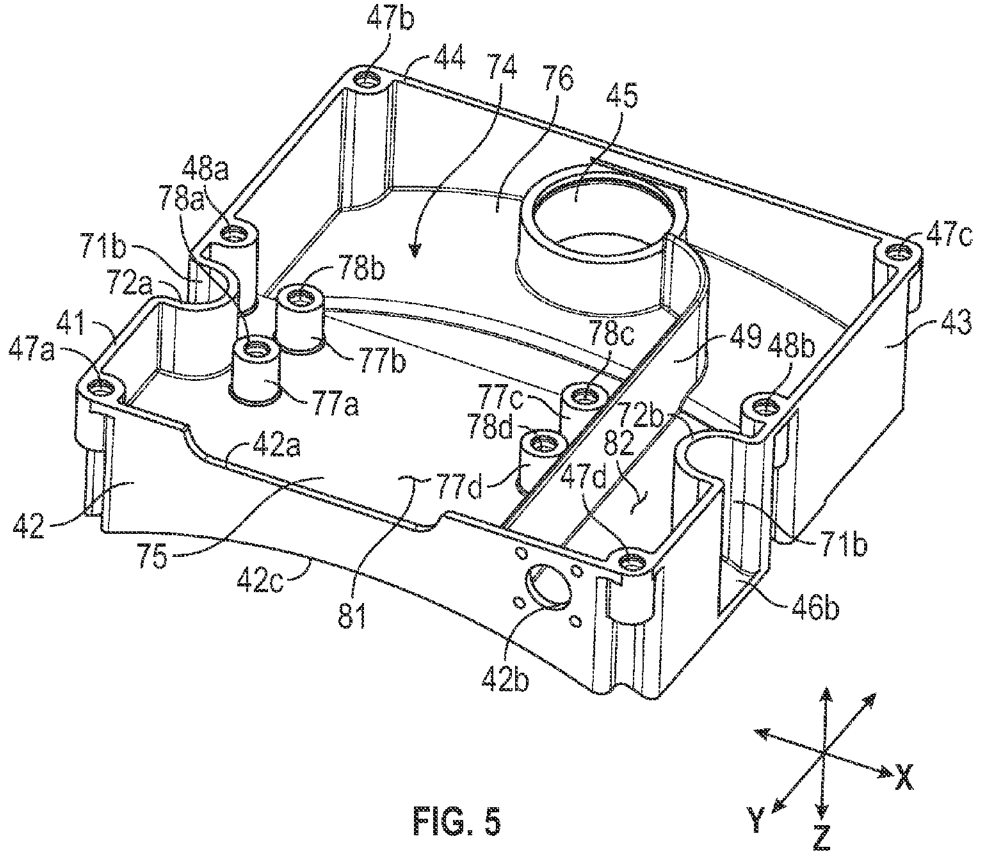
FIG. 5 is a perspective view of a terminal box according to an embodiment of the invention.
Figure 6C:
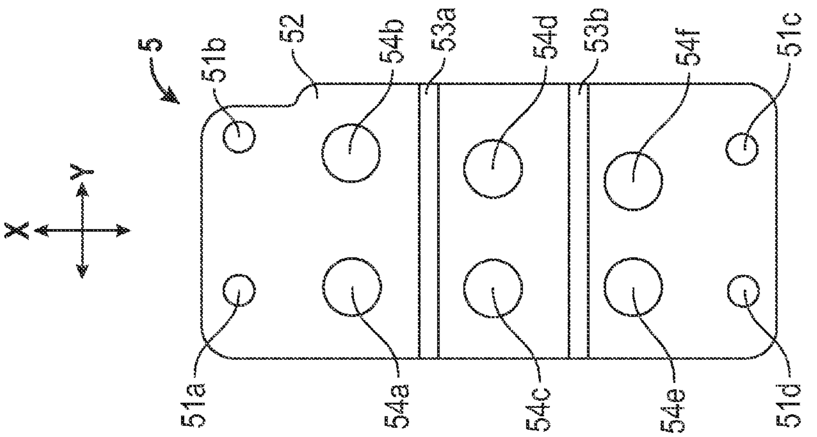
FIGS. 6A, 6B, and 6C illustrate side views of a terminal block according to embodiments of the invention.
Figure 6B:
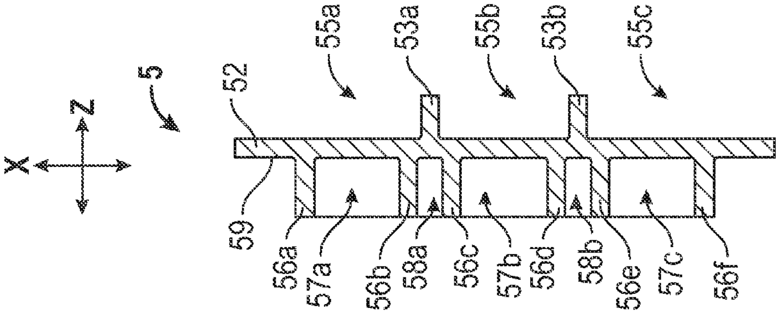
Figure 6A:
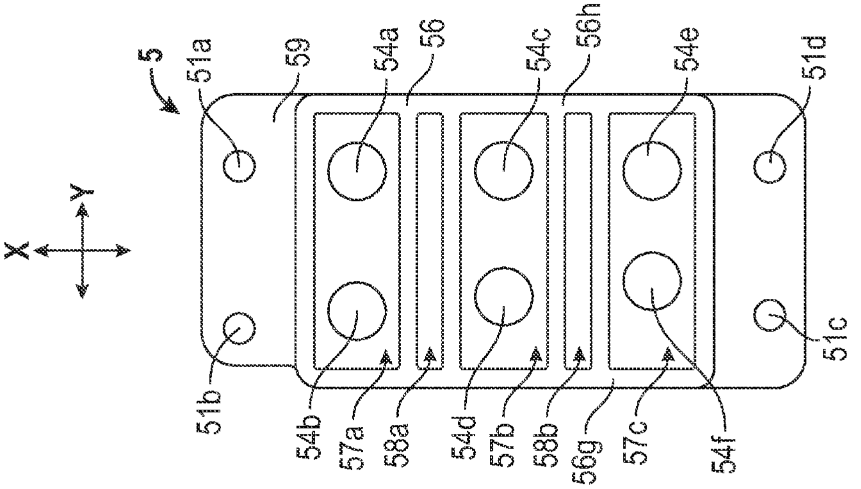
Figure 7:
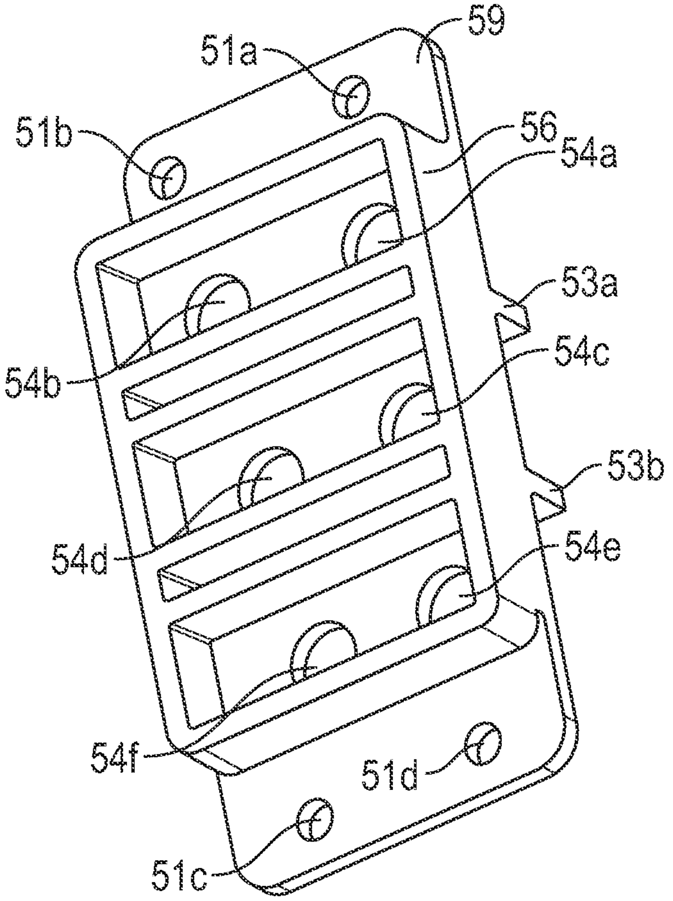
FIG. 7 is a perspective view of the terminal block according to an embodiment of the invention.

FIG. 5 illustrates the terminal box 4 in additional detail. As illustrated in FIG. 5, the front panel 42 includes a notch 42*a* in communication with the large cavity 81 of the terminal box 4, while the portion of the front panel 42 in communication with the small cavity 82 includes no notch. A ratio of the length of the front panel 42 to a length of the notch in a side-to-side direction along the axis X may be between 2.5:1 and 1.5:1. In one embodiment, the ratio of the length of the front panel 42 to a length of the notch in a side-to-side direction along the axis X is approximately 2.2:1. The notch 42*a* is recessed from an upper surface of the front panel 42, such that when a cover or cap is positioned on the terminal box 4, wires may extend from inside the terminal box 4 via the notch 42*a*.

The front panel 42 of the terminal box 4 includes a hole 42*b* in communication with the small cavity 82. The connector 63 may be mounted to the hole 42*b* to connect an external wire or device with the cable 62 connected to the connector 63 in the small cavity 82.

The bottom surface of the terminal box 4 may have a concave curve to permit the terminal box 4 to be mounted to the housing 21 of the fan 2. In one embodiment, an inside bottom surface of the terminal box 4 includes a flat portion 75 and a curved portion 76. The flat portion 75 may be parallel to a line that is tangential to the curve of the bottom surface of the terminal box 4. The flat portion 75 may be located in a front portion of the large cavity 81 and may correspond to the location of the terminal block 5. In other words, the mounting protrusions 77*a*, 77*b*, 77*c*, and 77*d* may extend from the flat portion 75.

In addition, the recess 71*b*, cover-mounting side hole 48*a*, and cover-mounting corner hole 47*a* may protrude into the portion of the large cavity 81 including the flat portion 75. For example, the concave portion 72*a* of the first side panel 41 may protrude into the flat portion 75. In one embodiment, a line extending in a side-to-side direction intersecting the centers of the mounting holes 73*a* and 73*b* extends between the mounting holes 78*a* and 78*b*, and between the mounting holes 78*c* and 78*d*.

The curved portion 76 of the inside surface of the terminal box 4 may be located at a rear portion terminal box 4. In other words, the curved portion 76 is located closer to the rear panel 44 along the front-to-rear axis Y than the flat portion 75. In one embodiment, the curved portion 76 extends across both the large cavity 81 and the small cavity 82, while the flat portion 75 extends only across the large cavity 81 in the side-to-side direction X. The rim 45 may extend upward from the curved portion 76 in the up-down direction Z. The curved portion 76 may have a curve that corresponds to a curve of a fan housing 21.

The front panel 42 and the rear panel 44 of the terminal box 4 may have a curved bottom side to conform to the curve of the housing 21 of the fan 2. A distance from a top of the front panel 42 (on a portion excluding the notch 42*a*) and rear panel 44 to a bottom of the front panel 42 and rear panel 44 in the height direction Z may be less at a center of the front panel 42 and rear panel 44 than at the ends of the front and rear panels 42 and 44. For example, a height of the front and rear panels 42 and 44 at the center of the front and rear panels 42 and 44 may be between $3/8$ and $5/8$ of a height of the front and rear panels 42 and 44 at the ends of the front and rear panels. In one embodiment, the height of the front and rear panels 42 and 44 at the center of the front and rear panels 42 and 44 is approximately $4/7$ of the height of the front and rear panels 42 and 44 at the ends of the front and rear panels.

A height of the notch 42*a* measured in the height direction Z from the bottom surface of the notch 42*a* (or the upper surface of the front panel 42 at the location of the notch 42*a*) to an upper surface of the front panel 42 on a portion that does not include the notch may be approximately 0.33 l.u. A height of the front panel 42 at the approximate center of the front panel 42 in the side-to-side direction X may be approximately 1.17 l.u. In other words, a ratio of the height of the notch 42*a* to a height of the front panel 42 at the approximate center of the front panel 42 in the side-to-side direction X may be between 1:3.0 and 1:4.0, such as 1:3.0.

In one embodiment, a side-to-side distance from an inside surface of the first side panel 41, on a portion not including the recess 71*a*, to a center of the mounting hole 78*b* is between 1.1 and 1.3 l.u., such as 1.2 l.u. In one embodiment, a front-to-rear distance from an inside surface of the front panel 42 to the center of the mounting hole 78*b* is between 3.000 and 3.250 l.u, such as 3.145 l.u. In one embodiment, a side-to-side distance from the center of the mounting hole 78*b* to a center of the mounting hole 78*c* is between 3.60 and 3.90 l.u., such as 3.76 l.u. In one embodiment, a front-to-rear distance from the center of the mounting hole 78*b* to a center of the mounting hole 78*a* is between 0.95 and 1.25 l.u., such as 1.10 l.u. In one embodiment, a side-to-side distance from a surface of the divider 49 facing the large cavity 81 to a center of the mounting hole **78*d*** is between 0.460 and 0.510 l.u., such as 0.485 l.u.

In other words, in one embodiment, a ratio of a distance between the centers of the mounting holes **78*a* and 78*b* to a distance between the mounting holes 78*a* to 78*d*** is between 1:2.5 and 1:3, such as 1:2.8.

In one embodiment, a distance in the side-to-side direction between the rim 45 and an inside surface of the second side panel 43 is between 2.6 and 3.0 l.u., such as 2.80 l.u. The divider 49 contacts the rim 45 on a side of the rim 45 facing the second side panel 43 and defines the small chamber 82 and the large chamber 81. In one embodiment, the divider 49 contacts the rim 45 at a location approximately 1.0 l.u. from the rear panel 44 in a front-to-rear direction. In one embodiment, the curved portion **49*a* of the divider contacts the rim 45. In one embodiment, the curved portion 49*a* has a linear length in the side-to-side direction of between 0.9 and 1.1 l.u., such as 1.0 l.u. In one embodiment, the curved portion 49*a* has a linear length in the front-to-rear direction of between 0.9 and 1.1 l.u., such as 1.0 l.u. In one embodiment, the straight portion 49*b* of the divider 49 has a length in the front-to-rear direction of between 4.8 and 5.4 l.u., such as 5.1 l.u. In other words, in one embodiment a ratio of a linear length of the curved portion 49*a* to a length of the straight portion 49*b*** in the front-to-rear direction is between 1:4.8 to 1:5.4, such as 1:5.1.

FIGS. 6A, 6B, 6C, and 7 illustrate the terminal block 5 in additional detail. The terminal block 5 includes an upper surface 52 and a lower surface 59. The lower surface 59 may face the flat portion 75 of the inside bottom surface of the terminal box 4, and the upper surface 52 may face opposite the lower surface 59. The terminal block 5 may include mounting holes **51*a*, 51*b*, 51*c*, and 51*d* to mount the terminal block 5 to the terminal box 4. For example, the mounting holes 51*a*, 51*b*, 51*c*, and 51*d* of the terminal block 5 may be aligned with the mounting holes 78*a*, 78*b*, 78*c*, and 78*d* of the terminal box 4, and a screw, bolt, or other fixing device may be inserted into the holes to mount the terminal block 5 to the terminal box 4**.

The terminal block 5 further includes contact mounting holes **54*a*, 54*b*, 54*c*, 54*d*, 54*e*, and 54*f* to connect contacts 64 to the terminal block 5. In one embodiment, the contact mounting holes 54*a*, 54*c*, and 54*e* are co-linear with each other in the side-to-side direction along the axis X. In one embodiment, the mounting holes 51*a* and 51*d* are co-linear with each other in the side-to-side direction. In one embodiment, the contact mounting holes 54*a*, 54*c*, and 54*e* are non-co-linear with the mounting holes 51*a* and 51*d*. In one embodiment, the mounting hole 51*a* is co-linear with the mounting hole 51*b* in the front-to-rear direction, and the mounting hole 51*c* is co-linear with the mounting hole 51*d*** in the front-to-rear direction.

In some embodiments, the mounting hole **54*a* is co-linear with the mounting hole 54*b* in the front-to-rear direction, the mounting hole 54*c* is co-linear with the mounting hole 54*d* in the front-to-rear direction, and the mounting hole 54*e* is co-linear with the mounting hole 54*f* in the front-to-rear direction. In one embodiment, one or more of the mounting holes 54*b*, 54*d*, and 54*f* are non-co-linear with one of the other mounting holes 54*b*, 54*d*, and 54*f* in the side-to-side direction. In one embodiment, none of the mounting holes 54*b*, 54*d*, and 54*f*** is co-linear in the side-to-side direction along the axis X.

In one embodiment, a distance between the mounting holes **54*a* and 54*b* is greater than a distance between mounting holes 54*c* and 54*d*, and the distance between mounting holes 54*c* and 54*d* is greater than a distance between mounting holes 54*e* and 54*f*. In one embodiment, a distance between the centers of the mounting holes 54*a* and 54*b* is between 0.95 l.u. and 1.05 l.u., such as 1.00 l.u. In one embodiment, a distance between mounting holes 54*c* and 54*d* is between 0.885 l.u. and 0.905 l.u., such as 0.895 l.u. In one embodiment, a distance between mounting holes 54*e* and 54*f* is between 0.78 l.u. and 0.80 l.u., such as 0.790 l.u. In one embodiment, a ratio of the distance between the mounting holes 54*a* and 54*b* and the distance between the mounting holes 54*c* and 54*d* is between 1:1.12 and 1:1.14, such as 1:1.13. In one embodiment, a ratio of the distance between the mounting holes 54*a* and 54*b* and the distance between the mounting holes 54*e* and 54*f*** is between 1:1.25 and 1:1.27, such as 1:1.26.

The terminal block 5 includes a mounting panel 56 extending in a height direction from the lower surface 59. The mounting panel 56 may include outer end panels **56*a* and 56*f* extending in a front-to-rear direction, and outer side panels 56*g* and 56*h* connected to ends of the outer end panels 56*a* and 56*f* and extending in a side-to-side direction. A plurality of inner panels 56*b*, 56*c*, 56*d*, and 56*e* may extend between the outer side panels 56*g* and 56*h* in a front-to-rear direction. In one embodiment, a plurality of inner panels is located between each set of contact holes 54*a*/54*b*, 54*c*/54*d*, and 54*e*/54*f*. Panels 56*a* and 56*b* may define a width of a first space 57*a*, panels 56*c* and 56*d* may define a width of a second space 57*b*, and panels 56*e* and 56*f* may define a width of a third space 57*c*. The outer side panels 56*g* and 56*h* may define the ends of the spaces 57*a*, 57*b*, and 57*c*. The first space 57*a* may correspond to the location of the mounting holes 54*a* and 54*b*, the second space 57*b* may correspond to the location of the mounting holes 54*c* and 54*d*, and the third space 57*c* may correspond to the location of the mounting holes 54*e* and 54*f***.

In addition, a fourth space **58*a* may be defined by panels 56*b* and 56*c*, and a fifth space 58*b* may be defined by panels 56*d* and 56*e*. In one embodiment, each of the first, second, and third spaces has a same width in the side-to-side direction and a same length in the front-to-rear direction. In one embodiment, each of the fourth space 58*a* and the fifth space 58*b*** has a same width in the side-to-side direction and a same length in the front-to-rear direction.

In one embodiment, each of the first, second, and third spaces has a width between 0.5 and 0.7 l.u., such as 0.61 l.u., and a length between 1.7 and 1.9 l.u., such as 1.82 l.u. In other words, in one embodiment, a ratio of a width to a length of the first, second, and third spaces **57*a*, 57*b*, and 57*c*** is between 1:2.8 and 1:3.2, such as 1:3.

In one embodiment, a distance from an inside surface of the side panel **56*h* to a center of the mounting holes 54*a*, 54*c*, and 54*e* is 0.410 l.u. In one embodiment, a diameter of the mounting holes 54*a*-54*f*** is between 0.396 l.u. and 0.416 l.u., such as 0.4 l.u.

In one embodiment, a distance in a side-to-side direction between a center of the mounting hole **51*d* and the contact mounting hole 54*e* is greater than a distance between a center of the contact mounting hole 54*e* and the center of the contact mounting hole 54*c*. In one embodiment, a side-to-side distance along the X axis between the center of the mounting hole 51*d* and the center of the contact mounting hole 54*e* is approximately 0.83 l.u. In one embodiment, a distance between the center of the contact mounting hole 54*e* and the center of the contact mounting hole 54*c* is approximately 1.0 l.u., such as 1.05 l.u. In one embodiment, a distance between the center of the contact mounting hole 54*c* and the center of the contact mounting hole 54*a* is approximately 1.0 l.u., such as 1.05 l.u. In one embodiment, a side-to-side distance along the X axis between the center of the mounting hole 51*a* and the center of the contact mounting hole 54*a*** is approximately 0.83 l.u.

The terminal block 5 includes dividers 53*a* and 53*b* extending in a front-to-rear direction. The divider 53*a* is positioned between the contact hole pairs 54*a*/54*b* and 54*c*/54*d*. The divider 53*b* is positioned between the contact hole pairs 54*c*/54*d* and 54*e*/54*f*. The dividers 53*a* and 53*b* divide the upper surface 52 into three sections 55*a*, 55*b*, and 55*c*. Each section includes a respective pair of contact holes corresponding to a contact 64 to be mounted to the terminal block 5. The dividers 53*a* and 53*b* physically and electrically isolate the contacts 64 from each other. In one embodiment, the dividers 53*a* and 53*b* are spaced apart from each other by a distance of 0.93 l.u. In one embodiment, a distance in the side-to-side direction between a center of the contact mounting holes 54*a*-54*f* and an adjacent divider 53*a* or 53*b* is between 0.48 l.u. and 0.50 l.u., such as 0.49 l.u. For example, a distance from a center of the contact mounting hole 54*a* to the divider 53*a* may be 0.49 l.u.

In one embodiment, the dividers 53*a* and 53*b* are located on the upper surface 52 of the terminal block 5 at a location corresponding to the spaces 58*a* and 58*b* on the bottom surface 59 of the terminal block 5 in the height direction Z. For example, at least a center of the divider 53*a* may be positioned between the inner mounting panels 56*b* and 56*c* in the side-to-side direction X. Similarly, at least a center of the divider 53*b* may be positioned between the inner mounting panels 56*d* and 56*e* in the side-to-side direction X.

According to the above-described embodiments, a terminal box 4 may be securely mounted on a fan housing 21. The terminal box 4 may be divided into portions to accommodate wiring, such as power wires 61 and a sensor cable 62. A terminal block 5 may be located within a large cavity 81 of the terminal box 4, and the terminal block 5 may be configured to securely mount to the terminal box 4 and/or the fan housing 21. The terminal block 5 may further be configured to have contacts 64 mounted onto the terminal block 5, and may have openings and holes configured to isolate the contacts 64 from each other and to differentiate between the contacts.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claim.

What is claimed is:

1. A terminal assembly, comprising:

a terminal box including a divider extending in a front-to-rear direction of the terminal box and dividing the terminal box into a first chamber and a second chamber, the first chamber being larger than the second chamber; and a terminal block mounted in the first chamber configured to have a plurality of contacts mounted onto the terminal block, wherein the terminal box includes a rim defining an opening in a bottom of the terminal box, the divider extending between the rim and a front panel of the terminal box.

2. The terminal assembly of claim 1, wherein a height of the divider is greater than a height of the rim.

3. The terminal assembly of claim 1, wherein the terminal box includes mounting protrusions extending in a height direction from a bottom inside surface of the terminal box in the first chamber, the terminal block includes a plurality of contact-mounting spaces on an upper surface of the terminal block, and the mounting protrusions are located on a lower surface of the terminal block on each side of the contact-mounting spaces in a side-to-side direction.

4. The terminal assembly of claim 1, wherein the terminal block includes a plurality of pairs of mounting holes arranged in a side-to-side direction, the mounting holes of each pair arranged co-linearly with each other in a front-to-rear direction.

5. The terminal assembly of claim 4, wherein a first hole of each pair of mounting holes is co-linear with a first hole of each other pair of mounting holes in the side-to-side direction, and a second hole of each pair of mounting holes is non-co-linear with a second hole of at least one other pair of mounting holes.

6. A terminal box, comprising:

a front panel, a rear panel, and two side panels connecting the front and rear panels to define an inside of the terminal box; and a divider extending in a front-to-rear direction of the terminal box and dividing the terminal box into a first chamber and a second chamber, the first chamber being larger than the second chamber, wherein a bottom surface of the terminal box inside the terminal box includes a flat portion and a curved portion having a concave shape in a height direction of the terminal box, the flat portion located toward a front of the terminal box with respect to at least a part of the curved portion.

7. The terminal box of claim 6, wherein the front panel has a notch at a top portion of the front panel, wherein a ratio of a length of the front panel to a length of the notch in a side-to-side direction is between 2.5:1 and 1.5:1.

8. The terminal box of claim 6, wherein the front panel includes a hole in a portion of the front panel corresponding to the second chamber in the terminal box, the hole configured to receive an electrical connector.

9. The terminal box of claim 6, wherein the flat portion extends to the divider in a side-to-side direction, and a bottom inside surface of the terminal box in the second chamber is part of the curved portion.

10. A terminal block, comprising: a plurality of terminal block mounting holes at ends of the terminal block in a side-to-side direction for mounting the terminal block to a terminal box; and a plurality of contact mounting holes arranged between the terminal block mounting holes in the side-to-side direction, the contact mounting holes arranged to be non-co-linear with the terminal block mounting holes in the side-to-side direction, wherein a ratio of a first length between a center of the first contact mounting hole and the second contact mounting hole, a second length between a center of the third contact mounting hole and the fourth contact mounting hole, and a third length between a center of the fifth contact mounting hole and the sixth contact mounting hole is approximately 1:1.13:1.26.

11. The terminal block according to claim 10, wherein the plurality of contact mounting holes comprises:

a first contact mounting hole and a second contact mounting hole arranged co-linearly in a front-to-rear direction;

a third contact mounting hole and a fourth contact mounting hole arranged co-linearly in the front-to-rear direction; and a fifth contact mounting hole and a sixth contact mounting hole arranged co-linearly in the front-to-rear direction, wherein the first, third, and fifth contact mounting holes are co-linear in the side-to-side direction, and the second, fourth, and sixth contact mounting holes are non-co-linear in the side-to-side direction.

12. The terminal block according to claim 11, wherein a center of the third contact mounting hole is equidistant between the centers of the first contact mounting hole and the fifth contact mounting hole in the side-to-side direction.

13. The terminal block according to claim 10, wherein the plurality of terminal block mounting holes comprises first and second terminal block mounting holes at one end of the terminal block and third and fourth terminal block mounting holes at an opposite end of the terminal block, wherein the first terminal block mounting hole is closest to the first contact mounting hole among the plurality of contact mounting holes, and wherein a distance in the side-to-side direction between the first terminal block mounting hole and the first contact mounting hole is greater than a distance in the side-to-side direction between the first contact mounting hole and the third contact mounting hole.

14. The terminal block according to claim 13, wherein a ratio of the distance in the side-to-side direction between the first terminal block mounting hole and the first contact mounting hole and the distance in the side-to-side direction between the first contact mounting hole and the third contact mounting hole is approximately 1.27:1.

15. The terminal block according to claim 10, wherein the plurality of contact mounting holes includes at least two pairs of contact mounting holes, and the at least two pairs of contact mounting holes is separated by a divider extending upward in a height direction from an upper surface of the terminal block.

16. The terminal block according to claim 10, further comprising:

an upper surface having contact mounting portions and a lower surface opposite the upper surface; and a mounting panel located on the bottom surface of the terminal block, the mounting panel including first panels extending in the side-to-side direction and second panels extending in a front-to-rear direction between the first panels, the first and second panels defining a plurality of enclosed spaces corresponding to the plurality of contact mounting holes.

17. The terminal block according to claim 16, wherein a ratio of a side-to-side width and a front-to-rear length of the plurality of enclosed spaces is between 1:2.8 and 1:3.2.

* * * * *